US012198665B2

(12) United States Patent
Wu

(10) Patent No.: US 12,198,665 B2
(45) Date of Patent: Jan. 14, 2025

(54) METHOD FOR DETECTING MELODY OF AUDIO SIGNAL AND ELECTRONIC DEVICE

(71) Applicant: BIGO TECHNOLOGY PTE. LTD., Singapore (SG)

(72) Inventor: Xiaojie Wu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 686 days.

(21) Appl. No.: 17/441,640

(22) PCT Filed: Jun. 27, 2019

(86) PCT No.: PCT/CN2019/093204

§ 371 (c)(1),
(2) Date: Sep. 21, 2021

(87) PCT Pub. No.: WO2020/199381

PCT Pub. Date: Oct. 8, 2020

(65) Prior Publication Data

US 2022/0165239 A1 May 26, 2022

(30) Foreign Application Priority Data

Mar. 29, 2019 (CN) ........................ 201910251678.X

(51) Int. Cl.
*G10H 1/38* (2006.01)
*G10H 1/40* (2006.01)
*G10L 25/90* (2013.01)

(52) U.S. Cl.
CPC ............... *G10H 1/383* (2013.01); *G10H 1/40* (2013.01); *G10L 25/90* (2013.01); *G10H 2210/066* (2013.01); *G10H 2210/076* (2013.01)

(58) Field of Classification Search
CPC .... G10H 1/383; G10H 1/40; G10H 2210/066; G10H 2210/076; G10L 25/90
(Continued)

(56) References Cited

U.S. PATENT DOCUMENTS 5,327,518 A * 7/1994 George .................. G10L 19/02
704/E19.01
6,587,816 B1 * 7/2003 Chazan .................. G10L 25/90
704/207
(Continued)

FOREIGN PATENT DOCUMENTS

CN 101504834 A 8/2009
CN 101710010 A 5/2010
(Continued)

OTHER PUBLICATIONS

Fujishima, Realtime Chord Recognition of Musical Sound: a System Using Common Lisp Music, 1999, http://hdl.handle.net/2027/spo.bbp2372.1999.446 (Year: 1999).*
(Continued)

*Primary Examiner* — Christina M Schreiber
(74) *Attorney, Agent, or Firm* — Kolitch Romano Dascenzo Gates LLC

(57) ABSTRACT

A method for detecting a melody of an audio signal, including: dividing the audio signal into a plurality of audio segments based on a beat, detecting a pitch frequency of each frame of audio sub-signal in each of the audio segments, and estimating a pitch value of each of the audio segments based on the pitch frequency; determining a pitch name corresponding to each of the audio segments based on a frequency range of the pitch value; acquiring a musical scale of the audio signal by estimating a tonality of the audio signal based on the pitch name of each of the audio segments; and determining a melody of the audio signal based
(Continued)

on a frequency interval of the pitch value of each of the audio segments in the musical scale.

17 Claims, 12 Drawing Sheets

(58) Field of Classification Search
USPC ............................................................ 84/613
See application file for complete search history.

(56) References Cited

U.S. PATENT DOCUMENTS

| | | | | | |
|---|---|---|---|---|---|
| 8,301,279 | B2 * | 10/2012 | Kobayashi | G10G 3/04 702/66 | |
| 8,618,401 | B2 * | 12/2013 | Kobayashi | G10H 1/0008 84/613 | |
| 2001/0024490 | A1 * | 9/2001 | Oda | H04M 19/041 379/88.01 | |
| 2008/0307945 | A1 * | 12/2008 | Gatzsche | G09B 15/023 84/477 R | |
| 2009/0119097 | A1 * | 5/2009 | Master | G10H 1/0008 704/207 | |
| 2009/0173216 | A1 * | 7/2009 | Gatzsche | G10H 1/383 84/613 | |
| 2017/0092245 | A1 * | 3/2017 | Kozielski | G06F 16/683 | |
| 2019/0294876 | A1 * | 9/2019 | Ayalon | G06F 18/24143 | |
| 2019/0378482 | A1 * | 12/2019 | Vorobyev | G10H 1/386 | |
| 2022/0165239 | A1 * | 5/2022 | Wu | G10H 1/0008 | |

FOREIGN PATENT DOCUMENTS

| | | | | | |
|---|---|---|---|---|---|
| CN | 101916564 | A | | 12/2010 | |
| CN | 102053998 | A | | 5/2011 | |
| CN | 101421778 | B | * | 8/2012 | G10H 1/383 |
| CN | 103854644 | A | | 6/2014 | |
| CN | 106057208 | A | | 10/2016 | |
| CN | 106157958 | A | | 11/2016 | |
| CN | 106157973 | A | | 11/2016 | |
| CN | 106547797 | A | * | 3/2017 | G06F 16/683 |
| CN | 106875929 | A | | 6/2017 | |
| EP | 0331107 | A2 | * | 9/1989 | |
| EP | 0367191 | A2 | * | 5/1990 | |
| JP | 2009186762 | A | | 8/2009 | |
| TW | 201222526 | A | * | 6/2012 | G06F 16/683 |
| WO | WO-0169575 | A1 | * | 9/2001 | G09B 15/023 |

OTHER PUBLICATIONS

European Patent Office, Extended European Search Report pursuant to Rule 62 EPC, dated Mar. 28, 2022 in Patent Application No. EP19922753.9, which is a foreign counterpart to this U.S. Application.

Fujishima, Takuya; "Realtime Chord Recognition of Musical Sound: a System Using Common Lisp Music", International Computer Music Conference. Proceedings, ICMC Proceedings, Oct. 22-27, 1999, pp. 464-467, abstract, section 2.2.

International Search Report of the International Searching Authority for State Intellectual Property Office of the People's Republic of China in PCT application No. PCT/CN2019/093204 issued on Jan. 3, 2020, which is an international application corresponding to this U.S. application.

The State Intellectual Property Office of People's Republic of China, First Office Action in Patent Application No. CN201910251678.X issued on May 29, 2020, which is a foreign counterpart application corresponding to this U.S. Patent Application, to which this application claims priority.

Notification to Grant Patent Right for Invention of Chinese Application No. 201910251678.X issued on Sep. 28, 2020.

* cited by examiner

| Pitch name | Number of semitone intervals | Multiple relationship | Frequency (Hz) |
|---|---|---|---|
| Perfect prime (A[1]) | 0 | $2^1 = 2$ | $440 \times 1 = 440$ |
| Augmented prime/ diminished second (A#1/Bb1) | 1 | $\sqrt[12]{2048} = 2^{\frac{11}{12}} \approx 1.8877486253633869932838263133351$ | $440 \times 2^{\frac{1}{12}} \approx 466.16376151808991640720312977762$ |
| Major second (B[1]) | 2 | $\sqrt[6]{32} = 2^{\frac{5}{6}} \approx 1.7817974362806786094804524111181$ | $440 \times 2^{\frac{1}{6}} \approx 493.88330125612411183075454185586$ |
| Minor third (C) | 3 | $\sqrt[4]{8} = 2^{\frac{3}{4}} \approx 1.6817928305074290860622509524664$ | $440 \times 2^{\frac{1}{4}} \approx 523.25113060119726935569998704666$ |
| Major third (C#) | 4 | $\sqrt[3]{4} = 2^{\frac{2}{3}} \approx 1.5874010519681994747517056392723$ | $440 \times 2^{\frac{1}{3}} \approx 554.36526195374419249757266720223$ |
| Perfect fourth (D) | 5 | $\sqrt[12]{128} = 2^{\frac{7}{12}} \approx 1.4983070768766814987992807320298$ | $440 \times 2^{\frac{5}{12}} \approx 587.32953583481512052556602772209$ |
| Augmented fourth/ diminished fifth (D#/ Eb) | 6 | $\sqrt{2} = 2^{\frac{1}{2}} \approx 1.4142135623730950488016887242097$ | $440 \times 2^{\frac{1}{2}} \approx 622.25396744416182147274303865222$ |
| Perfect fifth (E) | 7 | $\sqrt[12]{32} = 2^{\frac{5}{12}} \approx 1.3348398541700343648308318811845$ | $440 \times 2^{\frac{7}{12}} \approx 659.25511382573985947168352209930$ |
| Minor sixth (F) | 8 | $\sqrt[3]{2} = 2^{\frac{1}{3}} \approx 1.2599210498948731647672106072782$ | $440 \times 2^{\frac{2}{3}} \approx 698.45646286600776889075048127955$ |
| Major sixth (F#) | 9 | $\sqrt[4]{2} = 2^{\frac{1}{4}} \approx 1.1892071150027210667174999705605$ | $440 \times 2^{\frac{3}{4}} \approx 739.98884542326879786739041908522$ |
| Minor seventh (G) | 10 | $\sqrt[6]{2} = 2^{\frac{1}{6}} \approx 1.1224620483093729814335330496792$ | $440 \times 2^{\frac{5}{6}} \approx 783.99087196349858817139906091955$ |
| Major seventh (G#) | 11 | $\sqrt[12]{2} = 2^{\frac{1}{12}} \approx 1.0594630943592952645618252949463$ | $440 \times 2^{\frac{11}{12}} \approx 830.60939515989027704488357786670$ |
| Perfect eighth (A) | 12 | $2^0 = 1$ | $440 \times 2 = 880$ |

FIG. 7

METHOD FOR DETECTING MELODY OF AUDIO SIGNAL AND ELECTRONIC DEVICE

CROSS-REFERENCE TO RELATED APPLICATION

This application is a US national phase application of international application No. PCT/CN2019/093204, filed on Jun. 27, 2019, which claims priority to Chinese Patent Application No. 201910251678.X, filed on Mar. 29, 2019 and entitled "MELODY DETECTION METHOD FOR AUDIO SIGNAL, DEVICE AND ELECTRONIC APPARATUS". Both applications are incorporated herein by reference in their entireties.

TECHNICAL FIELD

The present disclosure relates to the field of audio processing, and in particular relates to a method and apparatus for detecting a melody of an audio signal and an electronic device.

BACKGROUND

In daily life, singing is an important cultural activity and entertainment. With the development of this entertainment, it is necessary to recognize melodies of songs sung by users, so as to classify the songs sung by the users or to automatically match chords according to preferences of the users. However, it is inevitable that users without professional music knowledge have slight pitch inaccuracies (off-tune) during singing. In this case, a challenge arises for accurate recognition of a music melody.

A conventional technical solution is to perform voice recognition on a song sung by a user, and acquire melody information of the song mainly by recognizing lyrics in an audio signal of the song and matching the lyrics in a database according to the recognized lyrics.

SUMMARY

The embodiments of the present disclosure provide a method for detecting a melody of an audio signal. The method includes the following steps:

dividing the audio signal into a plurality of audio segments based on a beat, detecting a pitch frequency of each frame of audio sub-signal in each of the audio segments, and estimating a pitch value of each of the audio segments based on the pitch frequency; determining a pitch name corresponding to each of the audio segments based on a frequency range of the pitch value; acquiring a musical scale of the audio signal by estimating a tonality of the audio signal based on the pitch name of each of the audio segments; and determining a melody of the audio signal based on a frequency interval of the pitch value of each of the audio segments in the musical scale.

In some embodiments, dividing the audio signal into the plurality of audio segments based on the beat, detecting the pitch frequency of each frame of audio sub-signal in each of the audio segments, and estimating the pitch value of each of the audio segments based on the pitch frequency includes: determining a duration of each of the audio segments based on a specified beat type; dividing the audio signal into several audio segments based on the duration, wherein the audio segments are bars determined based on the beat; separately detecting the pitch frequency of each frame of audio sub-signal in each of the audio sub-segments; and determining a mean value of the pitch frequencies of a plurality of continuously stable frames of the audio sub-signals in the audio sub-segment as a pitch value.

In some embodiments, upon determining the mean value of the pitch frequencies of the plurality of continuously stable frames of the audio sub-signals in the audio sub-segment as the pitch value, the method further includes: calculating a stable duration of the pitch value in each of the audio sub-segments; and setting the pitch value of the audio sub-segment to zero in response to the stable duration being less than a specified threshold.

In some embodiments, determining the pitch name corresponding to each of the audio segments based on the frequency range of the pitch value includes: acquiring a pitch name number by inputting the pitch value into a pitch name number generation model; and searching, based on the pitch name number, a pitch name sequence table for the frequency range of the pitch value of each of the audio segments, and determining the pitch name corresponding to the pitch value.

In some embodiments, in acquiring the pitch name number by inputting the pitch value into the pitch name number generation model, the pitch name number generation model is expressed as:

$$K = \left(12 \times \log_2\left(\frac{f_{m-n}}{a}\right)\right) \bmod 12 + 1,$$

wherein K represents the pitch name number, $f_{m-n}$ represents a frequency of the pitch value of an $n^{th}$ note in an $m^{th}$ audio segment of the audio segments, a represents a frequency of a pitch name for positioning, and mod represents a mod function.

In some embodiments, acquiring the musical scale of the audio signal by estimating the tonality of the audio signal based on the pitch name of each of the audio segments includes: acquiring the pitch name corresponding to each of the audio segments in the audio signal; estimating the tonality of the audio signal by processing the pitch name through a toning algorithm; and determining a number of semitone intervals of a positioning note based on the tonality, and acquiring the musical scale corresponding to the audio signal via calculation based on the number of semitone intervals.

In some embodiments, determining the melody of the audio signal based on the frequency interval of the pitch value of the audio segments in the musical scale includes: acquiring a pitch list of the musical scale of the audio signal, wherein the pitch list records a correspondence between the pitch value and the musical scale; searching the pitch list for a note corresponding to the pitch value based on the pitch value of the audio segments in the audio signal based on the pitch value; and arranging the notes in time sequences based on the time sequences corresponding to the pitch values in the audio segments, and converting the notes into the melody corresponding to the audio signal based on the arrangement.

In some embodiments, prior to dividing the audio signal into the plurality of audio segments based on the beat, detecting the pitch frequency of each frame of audio sub-signal in each of the audio segments, and estimating the pitch value of each of the audio segments based on the pitch frequency, the method further includes: performing Short-Time Fourier Transform (STFT) on the audio signal, wherein the audio signal is a humming or cappella audio signal; acquiring the pitch frequency by pitch frequency detection on a result of the STFT, wherein the pitch frequency is configured to detect the pitch value; inputting an interpolation frequency at a signal position corresponding to each frame of audio sub-signal in response to detecting no pitch frequency; and determining the interpolation frequency corresponding to the frame as the pitch frequency of the audio signal.

In some embodiments, prior to dividing the audio signal into the plurality of audio segments based on the beat, detecting the pitch frequency of each frame of audio sub-signal in each of the audio segments, and estimating the pitch value of each of the audio segments based on the pitch frequency, the method further includes: generating a music rhythm of the audio signal based on specified rhythm information; and generating reminding information of beat and time based on the music rhythm.

The embodiments of the present disclosure further provide an apparatus for detecting a melody of an audio signal. The apparatus includes: a pitch detection unit, configured to: divide an audio signal into a plurality of audio segments based on a beat, detect a pitch frequency of each frame of audio sub-signal in each of the audio segments, and estimate a pitch value of each of the audio segments based on the pitch frequency; a pitch name detection unit, configured to determine a pitch name corresponding to each of the audio segments based on a frequency range of the pitch value; a tonality detection unit, configured to acquire a musical scale of the audio signal by estimating a tonality of the audio signal based on the pitch name of each of the audio segments; and a melody detection unit, configured to determine a melody of the audio signal based on a frequency interval of the pitch value of each of the audio segments in the musical scale.

The embodiments of the present disclosure further provide an electronic device. The electronic device includes a processor and a memory configured to store one or more instructions executable by the processor. The processor is configured to perform the method for detecting the melody of the audio signal as defined in any one of the above embodiments.

The embodiments of the present disclosure further provide a non-transitory computer-readable storage medium storing one or more instructions. The one or more instructions, when executed by a processor of an electronic device, cause the electronic device to perform the method for detecting the melody of the audio signal as defined in any one of the above embodiments.

The solution for detecting the melody of the audio signal in the embodiments of the present disclosure includes: dividing an audio signal into a plurality of audio segments based on a beat, detecting a pitch frequency of each frame of audio sub-signal in each of the audio segments, and estimating a pitch value of each of the audio segments based on the pitch frequency; determining a pitch name corresponding to each of the audio segments based on a frequency range of the pitch value; acquiring a musical scale of the audio signal by estimating a tonality of the audio signal based on the pitch name of each of the audio segments; and determining a melody of the audio signal based on a frequency interval of the pitch value of each of the audio segments in the musical scale. According to the above technical solution, a melody of an audio signal acquired from user's humming or cappella is finally output by the processing steps such as estimating a pitch value, determining a pitch name, estimating a tonality, and determining a musical scale performed on the pitch frequencies of the plurality of frames of the audio sub-signals in the audio segments divided by the audio signal. The technical solution of the present disclosure accurately detects melodies of audio signals in poor singing and non-professional singing, such as self-composing, meaningless humming, wrong-lyric singing, unclear-word singing, unstable vocalization, inaccurate intonation, untuning, and voice cracking, without relying on users' standard pronunciation or accurate singing. According to the technical solution of the present disclosure, a melody hummed by a user can be corrected even in the case that the user is out of tune, and eventually a correct melody is output. Therefore, the technical solution of the present disclosure has better robustness in acquiring an accurate melody, and have a good recognition effect even in the case that a singer's off-key degree is less than 1.5 semitones.

BRIEF DESCRIPTION OF THE DRAWINGS

The following descriptions of embodiments with reference to the accompanying drawings make the foregoing and/or additional aspects and advantages of the present disclosure apparent and easily understood.

FIG. 7 shows a relationship among a number of semitone intervals, a pitch name and a frequency value and a relationship between a pitch value and a musical scale according to an embodiment of the present disclosure;

DETAILED DESCRIPTION

Figure 1:
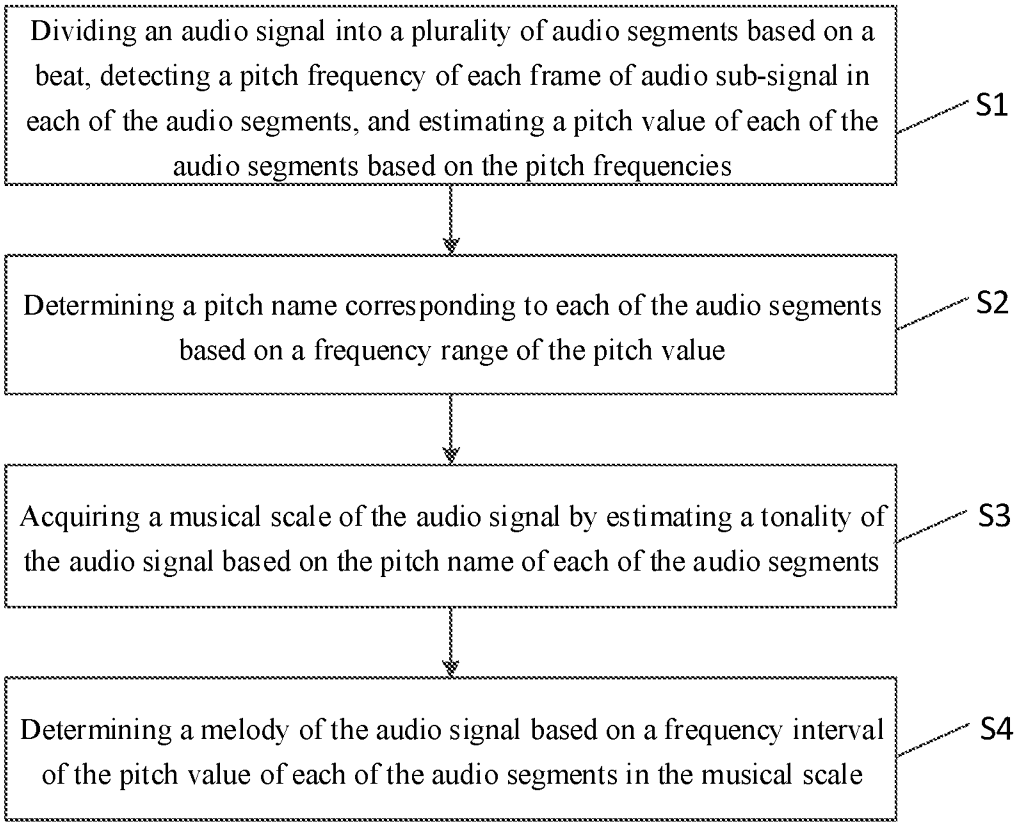
FIG. 1 is a flowchart of a method for detecting a melody of an audio signal according to an embodiment of the present disclosure.

The following describes embodiments of the present disclosure in detail. Examples of the embodiments of the present disclosure are illustrated in the accompanying drawings. Reference numerals which are the same or similar throughout the accompanying drawings represent the same or similar elements or elements with the same or similar functions. The embodiments described below with reference to the accompanying drawings are examples and used merely to interpret the present disclosure, rather than being construed as limitations to the present disclosure.

A conventional technical approach to recognize a music melody is to perform voice recognition on a song sung by a user, and acquire melody information of the song mainly by recognizing lyrics in an audio signal of the song and matching the lyrics in a database according to the recognized lyrics. However, in some situations, a user may just hum a melody without an explicit lyric, or just repeat simple lyrics of one or two words without an actual lyric meaning. In such situations, the voice recognition-based method can fail. In addition, the user may sing a melody composed by himself/herself and the database matching method is not applicable either.

To address the issues of low accuracy on the melody recognition and the high requirement for the pitch of the singer's singing to obtain the effective and accurate melody information, the present disclosure provides a technical solution for detecting a melody of an audio signal. The method is capable of recognizing and outputting the melody formed in the audio signal, and is particularly applicable to a cappella singing or humming, and singing with inaccurate intonation and the like. In addition, the present disclosure is also applicable to non-lyric singing and the like.

Referring to FIG. 1, the present disclosure provides a method for detecting a melody of an audio signal, including the following steps.

In step S1, an audio signal is divided into a plurality of audio segments based on a beat, a pitch frequency of each frame of audio sub-signal in the audio segments is detected, and a pitch value of each of the audio segments is estimated based on the pitch frequency.

In step S2, a pitch name corresponding to each of the audio segments is determined based on a frequency range of the pitch value.

In step S3, a musical scale of the audio signal is acquired by estimating a tonality of the audio signal based on the pitch name of each of the audio segments.

In step S4, a melody of the audio signal is determined based on a frequency interval of the pitch value of each of the audio segments in the musical scale.

In the above technical solution, recognizing a melody of an audio signal acquired from user's humming is taken as an example. A specified beat may be selected, the specified beat being the beat of the melody of the audio signal, for example, being ¼-beat, ½-beat, 1-beat, 2-beat, or 4-beat. According to the specified beat, the audio signal is divided into the plurality of audio segments, each of the audio segments corresponds to a bar of the beat, and each of the audio segments includes a plurality of frames of audio sub-signals.

In this embodiment, standard duration of a selected beat may be set to one bar and the audio signal may be divided into a plurality of audio segments based on the standard duration, that is, the audio segments may be divided based on the standard duration of one bar. Further, the audio segment of the bar is equally divided. For example, in response to one bar being equally divided into eight audio sub-segments, a duration of each of the audio sub-segments may be determined as output time of a stable pitch value.

In an audio signal, singing speeds of users are generally classified into fast (120 beats/min), medium (90 beats/min) and slow (30 beats/min) based on the user's singing speed. Taking that one bar contains two beats as an example, in response to a standard duration of one bar ranging from 1 second to 2 seconds, the output time of the pitch value approximately ranges from 125 to 250 milliseconds.

In step S1, in the case that a user hums to an $m^{th}$ bar, an audio segment in the $m^{th}$ bar is detected. In response to the audio segment in the $m^{th}$ bar being equally divided into eight audio sub-segments, one pitch value is determined for each of the audio sub-segments, that is, each of the sub-segments corresponds to one pitch value.

Specifically, each of the audio sub-segments includes a plurality of frames of audio sub-signals. A pitch frequency of each frame of the audio sub-signals can be detected, and a pitch value of each of the audio sub-segments may be acquired based on the pitch frequency. A pitch name of each of the audio sub-segments in each of the audio segments is determined based on the acquired pitch value of each of the audio sub-segments in each of the audio segments. Similarly, each of the audio segments may include either a plurality of pitch names or the same pitch name.

The musical scale of the audio signal is acquired by estimating, based on the pitch name of each of the audio segments, the tonality of the audio signal acquired from user's humming. In the case that the pitch names corresponding to the plurality of audio segments are acquired, the tonality corresponding to the audio signal is acquired by estimating the tonality of changes of the plurality of pitch names. A key of the hummed audio signal may be determined based on the tonality, and for example, the key may be C or F#. The musical scale of the hummed audio signal is determined based on the determined tonality and a pitch interval relationship.

Each of the notes of the musical scale corresponds to a certain frequency range. The melody of the audio signal is determined in response to determining, based on the pitch value of the audio segments, that the pitch frequencies of the audio segments fall within frequencies interval in the musical scale.

Figure 2:
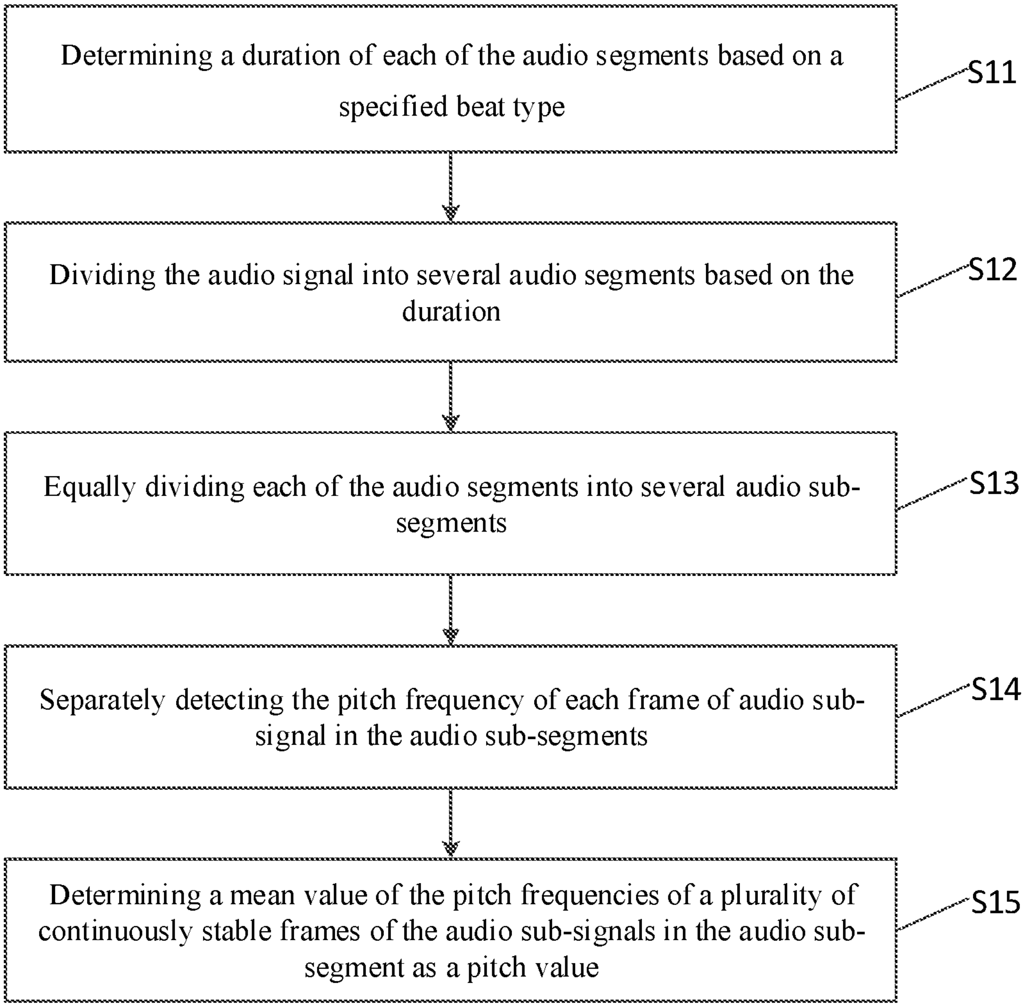
FIG. 2 is a flowchart of a method for determining a pitch value of each of the audio segments in an audio signal according to an embodiment of the present disclosure.

Referring to FIG. 2, an embodiment of the present disclosure provides a technical solution to acquire a more accurate pitch value. Step S1 described in FIG. 1 in which the audio signal is divided into the plurality of audio segments based on the beat, pitch frequency of each frame of the audio sub-signal in each of the audio segments is detected, and the pitch value of each of the audio segments is estimated based on the pitch frequency specifically includes the following steps.

In step S11, a duration of each of the audio segments is determined based on a specified beat type.

In step S12, the audio signal is divided into several audio segments based on the duration. The audio segments are bars determined based on the beat.

In step S13, each of the audio segments is equally divided into several audio sub-segments.

In step S14, the pitch frequency of each of the frames of an audio sub-signal in the audio sub-segments is separately detected.

In step S15, a mean value of the pitch frequencies of a plurality of continuously stable frames of the audio sub-signals in the audio sub-segment is determined as a pitch value.

According to the above technical solution, the duration of each of the audio segments may be determined based on a specified beat type. An audio signal of a certain time length is divided into several audio segments based on the duration of the audio segment. Each of the audio segments corresponds to the bar determined based on the beat.

Figure 3:
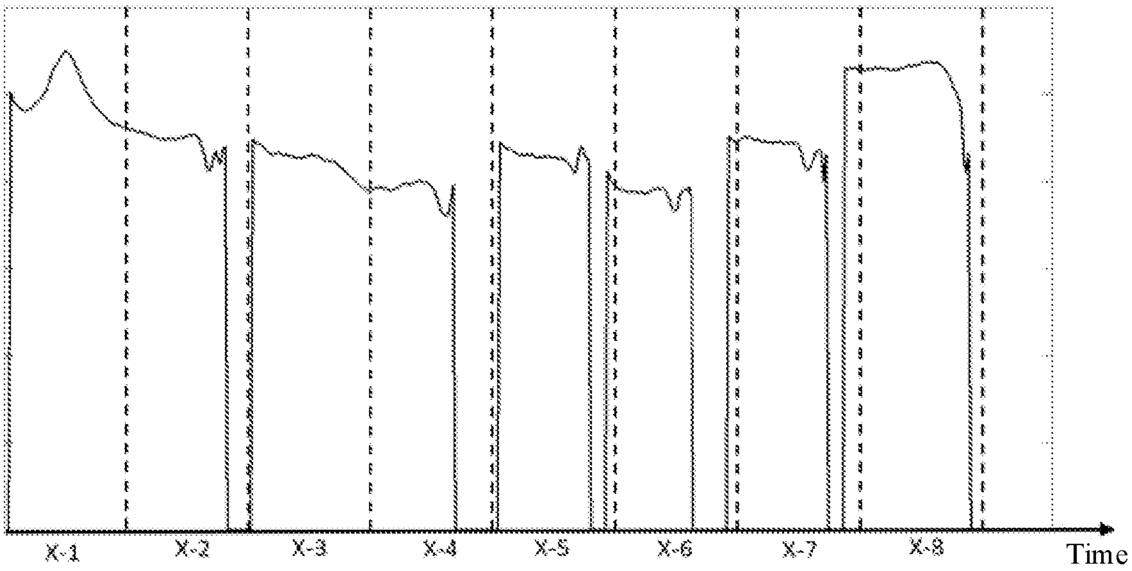
FIG. 3 is a schematic diagram of an audio segment divided into eight audio sub-segments in an audio signal of the present disclosure.

For better description of step S13, refer to FIG. 3. FIG. 3 shows an example of an audio signal in which one audio segment (one bar) of an audio segment is equally divided into eight audio sub-segments. In FIG. 3, the audio sub-segments include audio sub-segment X-1, audio sub-segment X-2, audio sub-segment X-3, audio sub-segment X-4, audio sub-segment X-5, audio sub-segment X-6, audio sub-segment X-7, and audio sub-segment X-8.

In an audio signal acquired from users' humming, each of the audio sub-segments generally includes three processes: starting, continuing, and ending. In each of the audio sub-segments shown in FIG. 3, a pitch frequency with the most stable pitch change and the longest duration is detected, and the pitch frequency is determined as a pitch value of the audio sub-segment. In the above detection process, starting and ending processes of each of the audio sub-segments are generally regions where pitches change more drastically. Accuracy of a detected pitch value may be affected by the regions with a drastic pitch change. In a further improved technical solution, the regions with a drastic pitch change may be removed prior to pitch value detection, so as to improve accuracy of a result of the pitch value detection.

Specifically, in each of the audio sub-segments, a segment whose pitch frequency changes within ±5 Hz and whose duration is the longest is determined as a continuously stable segment of the audio sub-segment based on a pitch frequency detection result.

In response to a duration of the segment with the longest duration being greater than a certain threshold, all pitch frequencies in the segment are averaged, and the acquired average value is output as the pitch value of the audio segment. The threshold refers to a minimum stable duration of each of the audio sub-segments. For example, in this embodiment, the threshold is selected as one third of a duration of the audio sub-segment. In a bar (an audio segment), in response to a duration of the longest segment being greater than a certain threshold, the bar (the audio segment) outputs eight notes, each of which corresponds to one audio sub-segment.

Figure 4:
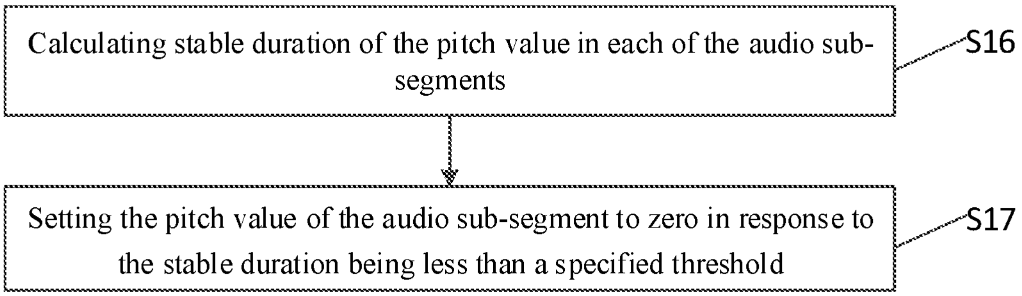
FIG. 4 is a flowchart of a method for configuring a pitch value whose stable duration is less than a threshold to zero of the present disclosure.

Referring to FIG. 4, an embodiment of the present disclosure provides a technical solution. Upon step S15 in which the mean value of the pitch frequencies of the plurality of frames of the continuously stable audio sub-signals in the audio sub-segment is determined as the pitch value, the technical solution further includes the following steps.

In step S16, stable duration of the pitch value in each of the audio sub-segments is calculated.

In step S17, the pitch value of the audio sub-segment is set to zero in response to the stable duration being less than a specified threshold. The threshold refers to the minimum stable duration of each of the audio sub-segments.

In the process of detecting a pitch value, time of a segment with the longest duration in each of the audio sub-segments is stable duration of the pitch value. The pitch value of the audio sub-segment is set to zero in response to the stable duration of the segment with the longest duration being less than the specified threshold.

Figure 5:
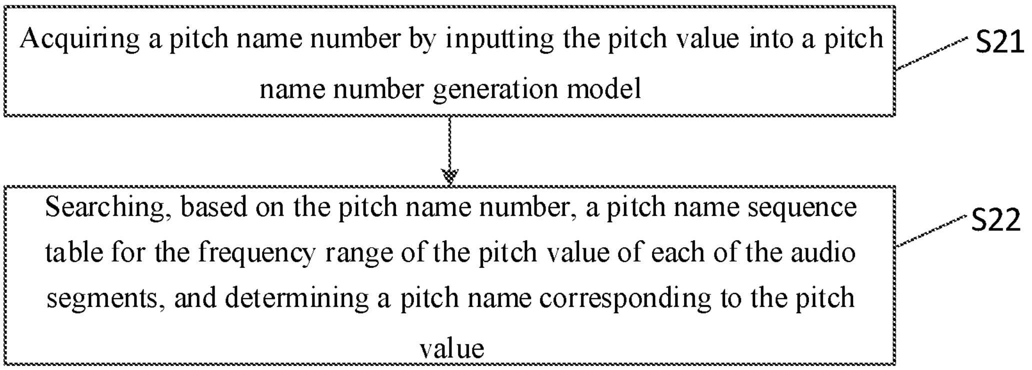
FIG. 5 is a flowchart of a method for determining a pitch name based on a frequency range of a pitch value according to an embodiment of the present disclosure.

An embodiment of the present disclosure further provides a technical solution for accurately detecting a pitch name of an audio segment. Referring to FIG. 5, step S2 described in FIG. 1 includes the following steps.

In step S21, the pitch value is input into a pitch name number generation model to acquire a pitch name number.

In step S22, a pitch name sequence table is searched, based on the pitch name number, for the frequency range of the pitch value of each of the audio segments; and the pitch name corresponding to the pitch value is determined.

In the above process, the pitch value of each of the audio segments is input into the pitch name number generation model to acquire the pitch name number.

The pitch name sequence table is searched, based on the pitch name number of each of the audio segments, for the frequency range of the pitch value of the audio segment, and the pitch name corresponding to the pitch value is determined. In this embodiment, a range of a value of the pitch name number may also correspond to a pitch name in the pitch name sequence table.

The present disclosure further provides a pitch name number generation model. The pitch name number generation model is expressed as:

$$K = \left(12 \times \log_2\left(\frac{f_{m-n}}{a}\right)\right) \text{mod} 12 + 1,$$

wherein K represents the pitch name number, $f_{m-n}$ represents a frequency of the pitch value of an $n^{th}$ note (corresponding to an $n^{th}$ audio sub-segment) in an $m^{th}$ audio segment (the $m^{th}$ bar) of the audio segments, a represents a frequency of a pitch name for positioning, and mod represents a mod function. A quantity 12 of pitch name numbers is determined based on twelve-tone equal temperament, that is, one octave includes twelve pitch names.

For example, it is assumed that an estimated pitch value $f_{4-2}$ of a second audio sub-segment X-2 of a fourth audio segment (a fourth bar) is 450 Hz. In this embodiment, a pitch name for positioning is determined as A, and a frequency of the pitch name is 440 Hz, that is, a=440 Hz. In this embodiment, the quantity 12 of pitch name numbers is determined based on the twelve-tone equal temperament.

In the case that $f_{4-2}$ is 450 Hz, a pitch name number K of a second note of the audio segment is 1. It can be learned, by searching the pitch name sequence table (with reference to FIG. 7, FIG. 7 shows the pitch name sequence table composed of relationships among a number of semitone intervals, pitch names, and frequency values), that a pitch name of the second note of the audio segment is A, that is, a pitch name of the audio sub-segment X-2 is A.

The following shows a pitch name sequence table. The pitch name sequence table records a one-to-one correspondence between a pitch name and a pitch name number range of a value of the pitch name number K.

A pitch name number range corresponding to pitch name A is: $0.5<K\leq1.5$;

A pitch name number range corresponding to pitch name A# is: $1.5<K\leq2.5$;

A pitch name number range corresponding to pitch name B is: $2.5<K\leq3.5$;

A pitch name number range corresponding to pitch name C is: $3.5<K\leq4.5$;

A pitch name number range corresponding to pitch name C# is: $4.5<K\leq5.5$;

A pitch name number range corresponding to pitch name D is: $5.5<K\leq6.5$;

A pitch name number range corresponding to pitch name D# is: $6.5<K\leq7.5$;

A pitch name number range corresponding to pitch name E is: $7.5<K\leq8.5$;

A pitch name number range corresponding to pitch name F is: $8.5<K\leq 9.5$;

A pitch name number range corresponding to pitch name F# is: $9.5<K\leq 10.5$;

A pitch name number range corresponding to pitch name G is: $10.5<K\leq 11.5$; and A pitch name number range corresponding to pitch name G# is: $11.5<K$ or $K\leq 0.5$.

Based on the pitch name number ranges, a pitch in user's singing which is out of tune may be initially processed to a pitch name close to accurate singing, which facilitates subsequent processing such as tonality estimation, musical scale determining, melody detection to improve accuracy of a subsequent output melody.

Figure 6:
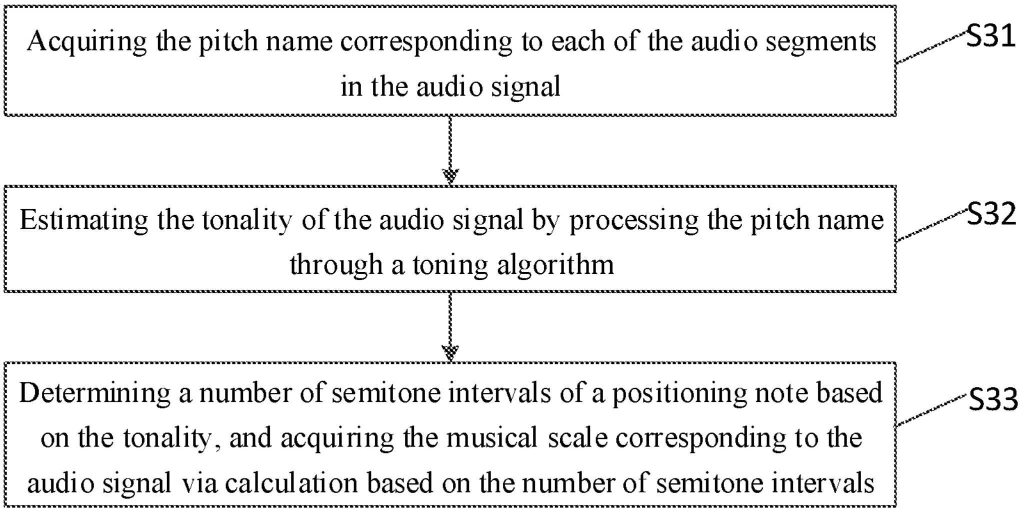
FIG. 6 is a flowchart of a method for toning and determining a musical scale based on a pitch name of each of the audio segments according to an embodiment of the present disclosure.

Referring to FIG. 6, the present disclosure provides a technical solution by which a tonality of an audio signal acquired from user's humming and a corresponding musical scale can be determined. In the present disclosure, step S3 described in FIG. 1 includes the following steps.

In step S31, the pitch name corresponding to each of the audio segments in the audio signal is acquired.

In step S32, the tonality of the audio signal is estimated by processing the pitch name through a toning algorithm.

In step S33, a number of semitone intervals of a positioning note is determined based on the tonality, and the musical scale corresponding to the audio signal is calculated based on the number of semitone intervals.

In the above process, the pitch name of each of the audio segments in the audio signal is acquired, and tonality estimation is performed based on a plurality of pitch names of the audio signal. The tonality is estimated through the toning algorithm. The toning algorithm may be Krumhansl-Schmuckler and the like. The toning algorithm may output the tonality of the audio signal acquired from the user's humming. For example, the tonality output in this embodiment of the present disclosure may be represented by a number of semitone intervals. Alternatively, the tonality may be represented by a pitch name. Numbers of semitone intervals are one-to-one corresponding to the 12 pitch names.

The number of semitone intervals of the positioning note may be determined based on the tonality determined through the toning algorithm. For example, in this embodiment of the present disclosure, the tonality of the audio signal is determined as F#, the number of semitone intervals of the audio signal is 9, and the pitch name is F#. In tone F#, F# is determined as Do (a syllable name). Do is a positioning note, that is, a first note of a musical scale. Certainly, in other possible processing fashions, any note in the musical scale may be determined as the positioning note, corresponding conversion may be performed. In this embodiment of the present disclosure, some processing may be eliminated by determining a first note as the positioning note.

In this embodiment of the present disclosure, a number of semitone intervals of a positioning note (Do) is determined as 9 based on a tone (F#) of an audio signal, and a musical scale of the audio signal is calculated based on the number of semitone intervals.

In the above process, the positioning note (Do) is determined based on the tone (F#). A positioning note is a first note in a musical scale, that is, a note corresponding to a syllable name (Do). The musical scale may be determined based on a pitch interval relationship (tone-tone-halftone-tone-tone-tone-halftone) in a major scale of tone F#. A musical scale of tone F# is represented based on a sequence of pitch names as: F#, G#, A#, B, C#, D#, F. A musical scale of tone F# is represented based on a sequence of syllable names as: Do, Re, Mi, Fa, Sol, La, Si.

In this embodiment of the present disclosure, in the case that the number of semitone intervals is acquired through the toning algorithm, the musical scale may be acquired according to the following conversion relationships:

$$Do=(\text{Key}+3) \bmod 12;$$

$$Re=(\text{Key}+5) \bmod 12;$$

$$Mi=(\text{Key}+7) \bmod 12;$$

$$Fa=(\text{Key}+8) \bmod 12;$$

$$Sol=(\text{Key}+10) \bmod 12;$$

$$\text{La}=\text{Key};$$

$$Si=(\text{Key}+2) \bmod 12.$$

In the above conversion relationships, Key represents a number of semitone intervals of a positioning note determined based on a tonality; mod represents a mod function; and Do, Re, Mi, Fa, Sol, La, and Si respectively represent numbers of semitone intervals of syllable names in a musical scale. In the case that the number of semitone intervals of each of the syllable names is acquired, each of the pitch names in the musical scale can be determined based on FIG. 7.

FIG. 7 shows relationships among numbers of semitone intervals, pitch names, and frequency values, including multiple relationships of the frequency values between the numbers of semitone intervals and the pitch names.

In this embodiment of the present disclosure, in response to a tonality output through the toning algorithm being C, a number of semitone intervals is 3; and a musical scale of an audio signal whose tonality is C may be conversed based on a pitch interval relationship. A musical scale represented based on a sequence of pitch names is: C, D, E, F, G, A, B. A musical scale represented based on a sequence of syllable names is: Do, Re, Mi, Fa, Sol, La, Si.

Figure 8:
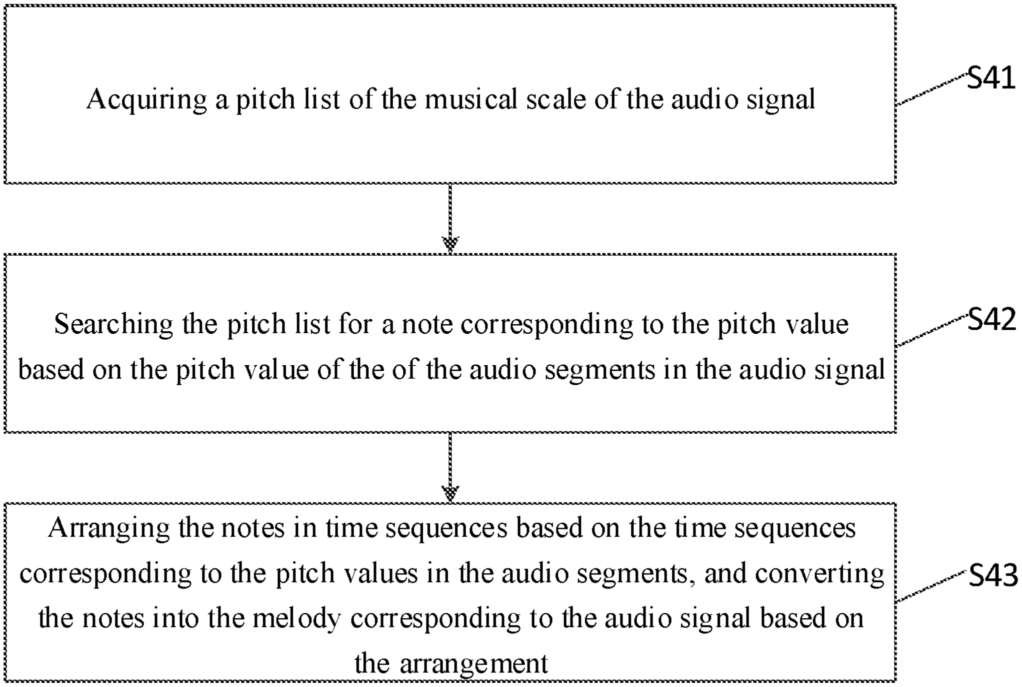
FIG. 8 is a flowchart of a method for generating a melody from a pitch value based on a tonality and a musical scale according to an embodiment of the present disclosure.

Referring to FIG. 8, an embodiment of the present disclosure provides a technical solution. Step S4 in which the melody of the audio signal is determined based on the frequency interval of the pitch value of the audio segments in the musical scale includes the following steps.

In step S41, a pitch list of the musical scale of the audio signal is acquired.

The pitch list records a correspondence between the pitch value and the musical scale. The pitch list may be referred to FIG. 7 (FIG. 7 shows the pitch list composed of the correspondence between the pitch value and the musical scale). Each of the pitch names in the musical scale corresponds to one pitch value. The pitch value is represented by a frequency (Hz)

In step S42, the pitch list is searched for a note corresponding to the pitch based on the pitch value of the audio segments in the audio signal.

In step S43, the notes are arranged in time sequences based on the time sequences corresponding to the pitch values in the audio segments, and the notes are converted into the melody corresponding to the audio signal based on the arrangement.

In the above process, the pitch list of the musical scale of the audio signal may be acquired, as shown in FIG. 7. The pitch list may be searched for the note corresponding to the pitch value based on the pitch value of the audio segments the audio signal. The note may be represented by a pitch name.

For example, in this embodiment of the present disclosure, in the case that the pitch value is 440 Hz, it is found by searching the pitch list that the pitch name of the note is $A^1$. Therefore, a note and duration of the note can be found at the time point corresponding to the frequency based on the frequency of a pitch value of each of the audio segments in the audio signal.

The notes are arranged based on time sequences corresponding to the pitch values in the audio segments. The notes are converted into the melody of the audio signal based on the time sequences of the notes. The acquired melody may be displayed as a numbered musical notation, a staff, pitch names, or syllable names, or may be music output of standard intonation.

In this embodiment of the present disclosure, in the case that the melody is acquired, the melody may further be hummed for retrieval, i.e., for retrieval of songs information, and the hummed melody may further be chorded, accompanied and harmonized, and the type of songs hummed by the user may be determined to analyze characteristics of the user. In addition, a difference between the hummed melody and the acquired melody may be calculated to obtain a score of the user's humming accuracy.

Figure 9:
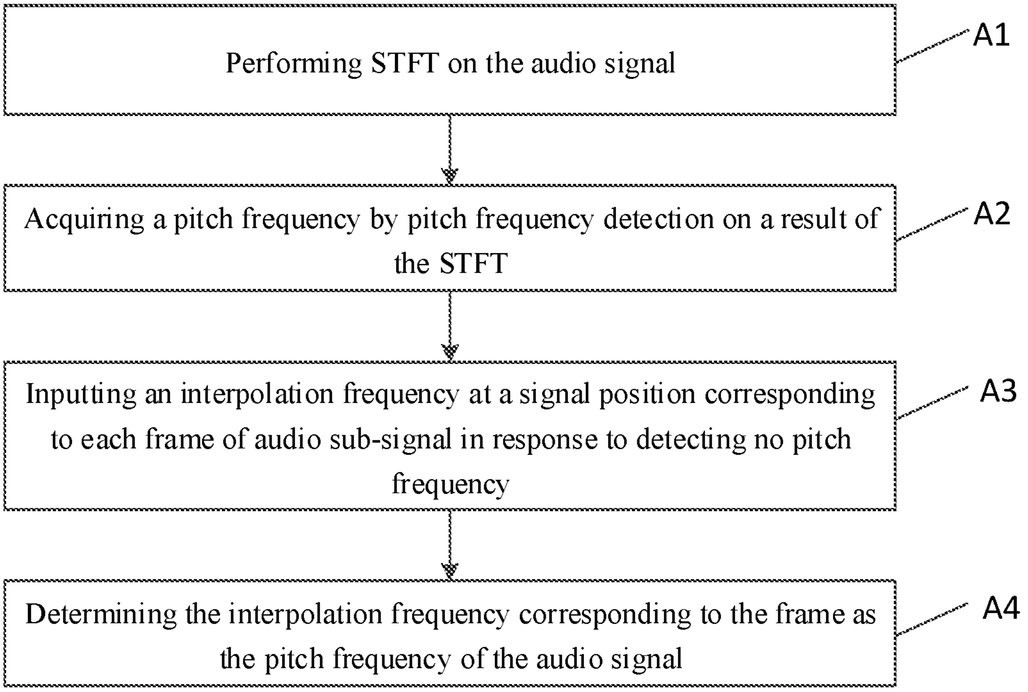
FIG. 9 is a flowchart of a method for preprocessing an audio signal according to an embodiment of the present disclosure.

Referring to FIG. 9, in an embodiment of the present disclosure, prior to the step S1 in which the audio signal is divided into the plurality of audio segments based on the beat, pitch frequency of each frame of the audio sub-signal in each of the audio segments is detected, and the pitch value of each of the audio segments is estimated based on the pitch frequency, the technical solution further includes the following steps.

In step A1, Short-Time Fourier Transform (STFT) is performed on the audio signal. The audio signal is a humming or cappella audio signal.

In step A2, a pitch frequency is acquired by pitch frequency detection on a result of the STFT.

The pitch frequency is configured to detect the pitch value.

In step A3, an interpolation frequency is input at a signal position corresponding to frames of an audio sub-signal in response to no pitch frequency being detected.

In step A4, the interpolation frequency corresponding to the frame is determined as the pitch frequency of the audio signal.

In the above process, an audio signal acquired from user's humming may be acquired by a voice recording device. STFT is performed on the audio signal. The result of STFT is output in the case that the audio signal is processed. A multi-frame result of STFT is acquired in the case that STFT is performed on the audio signal based on a frame length and a frame shift.

The audio signal may be acquired from a hummed or a cappella song which may be a self-composing song. A pitch frequency is acquired by detecting each of the frames of the result of STFT, thereby a multi-frame pitch frequency of the audio signal is acquired. The pitch frequency may be configured to detect the pitch of the subsequent audio signal.

It is possible that the pitch frequency may not be detected because the user sings softly or an acquired audio signal is weak. In response to no pitch frequency being detected in some audio sub-segments in the audio signal, the interpolation frequency is input at signal positions of the audio sub-signals. The interpolation frequency may be acquired using an interpolation algorithm. The interpolation frequency may be determined as a pitch frequency of an audio sub-segment corresponding to the interpolation frequency.

Figure 10:
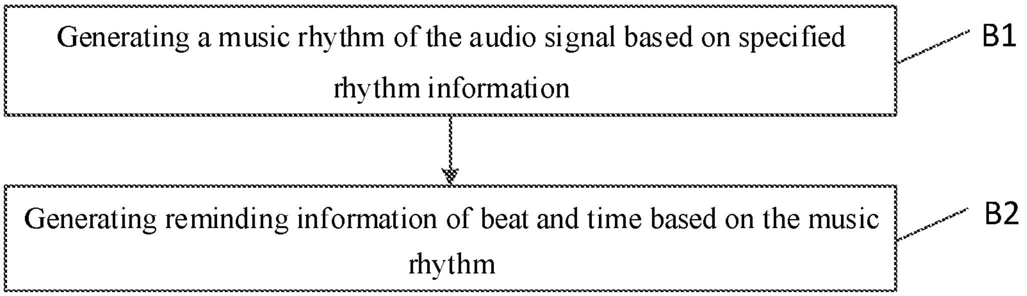
FIG. 10 is a flowchart of a method for generating reminding information based on selected rhythm information according to an embodiment of the present disclosure.

Referring to FIG. 10, to further improve accuracy of melody recognition, an embodiment of the present disclosure provides a technical solution. Prior to the step S1 described in FIG. 1, the pitch frequency of each frame of the audio sub-signal in each of the audio segments is detected, and the pitch value of each of the audio segments is estimated based on the pitch frequency, the technical solution further includes the following steps.

In step B1, a music rhythm of the audio signal is generated based on specified rhythm information.

In step B2, reminding information of beat and time is generated based on the music rhythm.

In the above process, the user may select rhythm information based on a song to be hummed. A music rhythm of an audio signal corresponding to the acquired rhythm information set by the user is generated.

Further, reminding information is generated based on the acquired rhythm information. The reminding information may remind the user about beat and time of an audio signal to be generated. For ease of understanding, the beat may be in a form of drums, piano sound, or the like, or may be in a form of vibration and flash of a device held by the user.

For example, in this embodiment of the present disclosure, rhythm information selected by the user is ¼ beat. A music rhythm is generated based on ¼ beat, and a beat matching ¼ beat is generated and fed back to the device (for example, a mobile phone or a singing tool) held by the user, to remind the user about the ¼-beat in a form of vibration. In addition, drums or piano accompaniment may be generated to assist the user in humming according to the ¼-beat beat. The device or earphone held by the user may play the drums or piano accompaniment to the user, thereby improving accuracy of the moldy of the acquired audio signal.

The user may be reminded, based on a time length selected by the user, about a start point and an end point of humming by a vibration or a beep at the start or end of the humming. In addition, the reminding information may also be provided by a visual means, such as a display screen.

Figure 11:
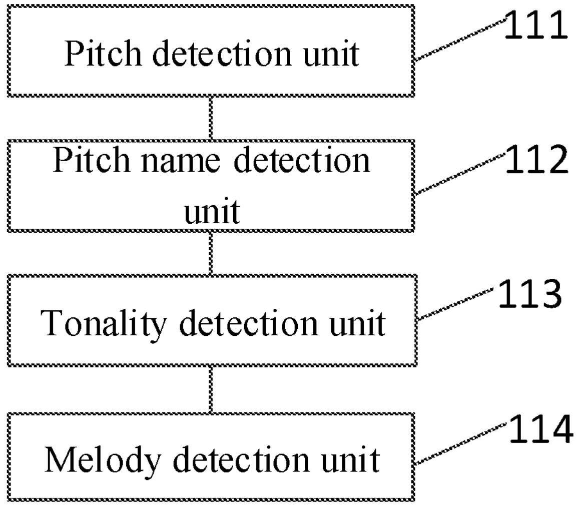
FIG. 11 is a structural diagram of an apparatus for detecting a melody of an audio signal according to an embodiment of the present disclosure.

Referring to FIG. 11, in order to overcome technical defects of requiring high accuracy of audio signal, low recognition accuracy and incapable of acquiring effective and accurate melody information, the present disclosure provides an apparatus for detecting a melody of an audio signal. The apparatus includes:

a pitch detection unit 111, configured to divide an audio signal into a plurality of audio segments based on a beat, detect a pitch frequency of each frame of audio sub-signal in each of the audio segments, and estimate a pitch value of each of the audio segments based on the pitch frequency;

a pitch name detection unit 112, configured to determine a pitch name corresponding to each of the audio segments based on a frequency range of the pitch value;

a tonality detection unit 113, configured to acquire a musical scale of the audio signal by estimating a tonality of the audio signal based on the pitch name of each of the audio segments; and a melody detection unit 114, configured to determine a melody of the audio signal based on a frequency interval of the pitch value of each of the audio segments in the musical scale.

Figure 12:
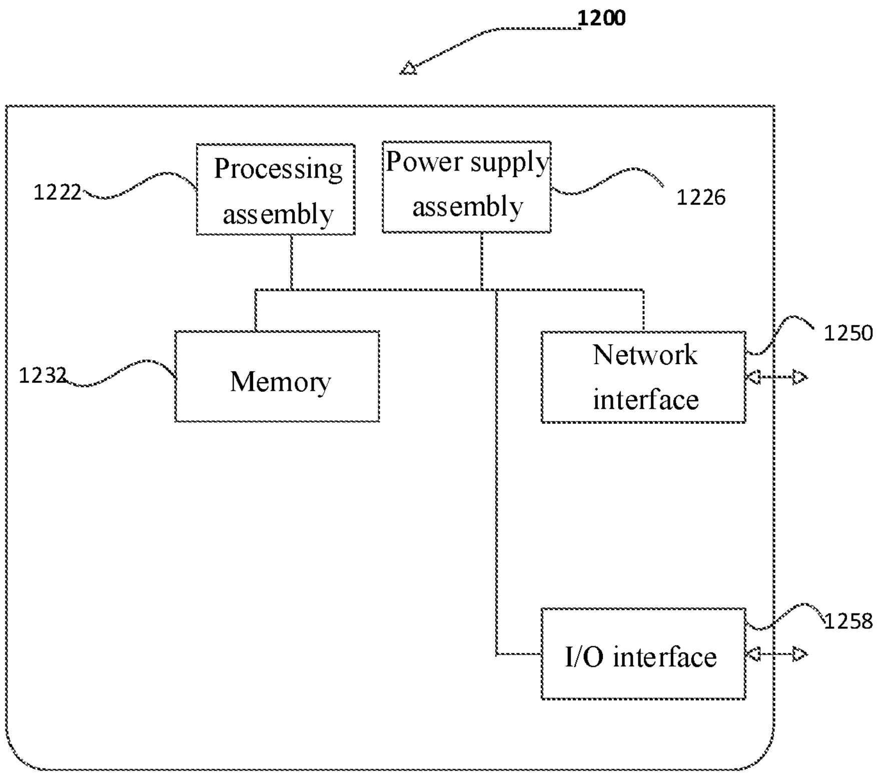
FIG. 12 is a flowchart of an electronic device for detecting a melody of an audio signal according to an embodiment of the present disclosure.

Referring to FIG. 12, an embodiment further provides an electronic device. The electronic device includes a processor and a memory configured to store an instruction executable by the processor. The processor is configured to perform the method for detecting the melody of the audio signal as defined in any one of the above embodiments.

Specifically, FIG. 12 is a block diagram of an electronic device for performing the method for detecting the melody of the audio signal according to an example embodiment. For example, the electronic device 1200 may be provided as a server. Referring to FIG. 12, the electronic device 1200 includes a processing assembly 1222, and further includes one or more processors, and storage resources represented by a memory 1232 which is configured to store an instruction, for example, an application program, executed by the processing assembly 1222. The application program stored in the memory 1232 may include one or more modules each of which corresponds to a set of instructions. In addition, the processing assembly 1222 is configured to execute an instruction to perform the method for detecting the melody of the audio signal.

The electronic device 1200 may further include a power supply assembly 1226 configured to perform power management of the electronic device 1200, a wired or wireless network interface 1250 configured to connect the electronic device 1200 to a network, and an input/output (I/O) interface 1258. The electronic device 1200 may operate an operating system stored in the memory 1232, such as Windows Server™, Mac OS X™, Unix™, Linux™, FreeBSD™, or the like. The electronic device may be a computer device, a mobile phone, a tablet computer or other terminal.

An embodiment further provides a non-transitory computer-readable storage medium. In response to an instruction in the storage medium being executed by the processor of the electronic device, the electronic device may perform the method for detecting the melody of the audio signal as defined in the above embodiments.

A solution for detecting a melody of an audio signal in the embodiments of the present disclosure includes: dividing an audio signal into a plurality of audio segments based on a beat, detecting a pitch frequency of each frame of audio sub-signal in the audio segments, and estimating a pitch value of each of the audio segments based on the pitch frequency; determining a pitch name corresponding to each of the audio segments based on a frequency range of the pitch value; acquiring a musical scale of the audio signal by estimating a tonality of the audio signal based on the pitch name of each of the audio segments; and determining a melody of the audio signal based on a frequency interval of the pitch value of each of the audio segments in the musical scale. According to the above technical solution, a melody of an audio signal acquired from user's humming or cappella is finally output by the processing steps such as estimating a pitch value, determining a pitch name, estimating a tonality, and determining a musical scale performed on the pitch frequencies of the plurality of frames of the audio sub-signals in the audio segments divided by the audio signal. The technical solution according to the embodiments of the present disclosure allows to accurately detect melodies of audio signals in poor singing and non-professional singing, such as self-composing, meaningless humming, wrong-lyric singing, unclear-word singing, unstable vocalization, inaccurate intonation, untuning, and voice cracking, without relying on users' standard pronunciation or accurate singing. According to the technical solution according to the embodiments of the present disclosure, a melody hummed by a user can be corrected even in the case that the user is out of tune, and eventually a correct melody is output finally. Therefore, the technical solution of the present disclosure has better robustness in acquiring an accurate melody, and have a good recognition effect even in the case that a singer's off-key degree is less than 1.5 semitones.

It should be understood that although the various steps in the flowchart of the drawings are sequentially displayed as indicated by the arrows, these steps are not necessarily performed in the order indicated by the arrows. Unless explicitly stated herein, the execution of these steps is not strictly limited, and may be performed in other sequences. Moreover, at least some of the steps in the flowchart of the drawings may include a plurality of sub-steps or stages, which are not necessarily performed simultaneously, but may be executed at different time. The execution order thereof is also not necessarily performed sequentially, but may be performed in turn or alternately with at least a portion of other steps or sub-steps or stages of other steps.

The above descriptions are merely some implementations of the present disclosure. It should be noted that a person of ordinary skill in the art may make several improvements or polishing without departing from the principle of the present disclosure and the improvements or polishing should be included within the protection scope of the present disclosure.

What is claimed is:

1. A method for detecting a melody of an audio signal, comprising:

performing, with a processor, Short-Time Fourier Transform (STFT) on the audio signal, wherein the audio signal is a humming or cappella audio signal acquired by a voice recording device;

acquiring, with the processor, a pitch frequency by pitch frequency detection on a result of the STFT, wherein the pitch frequency is configured to detect a pitch value;

inputting, with the processor, an interpolation frequency at a signal position corresponding to a frame of audio sub-signal in response to detecting no pitch frequency; and determining, with the processor, the interpolation frequency corresponding to a frame as the pitch frequency of the audio signal;

dividing, with the processor, the audio signal into a plurality of audio segments based on a beat, wherein each of the plurality of audio segments comprises a plurality of audio sub-signal frames;

detecting, with the processor, a pitch frequency of each of the plurality of audio sub-signal frames in each of the plurality of audio segments, and estimating a pitch value of each of the plurality of audio segments based on the pitch frequency;

determining, with the processor, a pitch name corresponding to each of the audio segments based on a frequency range of the pitch value of each of the plurality of audio segments;

acquiring, with the processor, a musical scale of the audio signal by estimating a tonality of the audio signal based on the pitch name of each of the audio segments;

determining, with the processor, a melody of the audio signal based on a frequency interval of the pitch value of each of the plurality of audio segments in the musical scale; and retrieving, with the processor, song information of the melody of the audio signal, and chording, accompanying and harmonizing the melody of the audio signal.

2. The method for detecting the melody of the audio signal according to claim 1, wherein dividing the audio signal into the plurality of audio segments based on the beat, detecting the pitch frequency of each of the plurality of audio sub-signal frames in each of the plurality of audio segments, and estimating the pitch value of each of the plurality of audio segments based on the pitch frequency comprises:

determining a duration of each of the audio segments based on a specified beat type;

dividing the audio signal into the plurality of audio segments based on the duration, wherein the audio segments are bars determined based on the beat;

equally dividing each of the audio segments into several audio sub-segments;

separately detecting the pitch frequency of each of the plurality of audio sub-signal frames in each of the plurality of audio segments, wherein each of the audio sub-segments comprises a plurality of audio sub-signal frames; and determining a mean value of pitch frequencies of a plurality of continuously stable frames of audio sub-signals in the audio sub-segment as the pitch value of each of the plurality of audio segments.

3. The method for detecting the melody of the audio signal according to claim 2, wherein upon determining the mean value of the pitch frequencies of the plurality of continuously stable frames of the audio sub-signals in the audio sub-segment as the pitch value of each of the plurality of audio segments, the method further comprises:

calculating a stable duration of the pitch value in each of the audio sub-segments; and setting the pitch value of the audio sub-segment to zero in response to the stable duration being less than a specified threshold.

4. The method for detecting the melody of the audio signal according to claim 1, wherein determining the pitch name corresponding to each of the audio segments based on the frequency range of the pitch value of each of the plurality of audio segments comprises:

acquiring a pitch name number by inputting the pitch value of each of the plurality of audio segments into a pitch name number generation model; and searching, based on the pitch name number, a pitch name sequence table for the frequency range of the pitch value of each of the plurality of audio segments, and determining the pitch name corresponding to the pitch value.

5. The method for detecting the melody of the audio signal according to claim 4, wherein the pitch name number generation model is expressed as:

$$K = \left(12 \times \log_2\left(\frac{f_{m-n}}{a}\right)\right) \text{mod} 12 + 1,$$

represents the pitch name number, $f_{m-n}$ represents a frequency of a pitch value of an $n^{th}$ note in an $m^{th}$ audio segment of the plurality of audio segments, a represents a frequency of a pitch name for positioning, and mod represents a mod function.

6. The method for detecting the melody of the audio signal according to claim 1, wherein acquiring the musical scale of the audio signal by estimating the tonality of the audio signal based on the pitch name of each of the audio segments comprises:

acquiring the pitch name corresponding to each of the audio segments in the audio signal;

estimating the tonality of the audio signal by processing the pitch name using a toning algorithm; and determining a number of semitone intervals of a positioning note based on the tonality, and acquiring the musical scale corresponding to the audio signal by calculation based on the number of semitone intervals.

7. The method for detecting the melody of the audio signal according to claim 1, wherein determining the melody of the audio signal based on the frequency interval of the pitch value of each of the plurality of audio segments in the musical scale comprises:

acquiring a pitch list of the musical scale of the audio signal, wherein the pitch list records a correspondence between the pitch value of each of the plurality of audio segments and the musical scale;

searching, based on the pitch value of each of the plurality of audio segments in the audio signal, the pitch list for a note corresponding to the pitch value of each of the plurality of audio segments; and arranging the notes in time sequences based on time sequences corresponding to the pitch values in the audio segments, and converting the notes into the melody corresponding to the audio signal based on the arrangement.

8. The method for detecting the melody of the audio signal according to claim 1, wherein prior to dividing the audio signal into the plurality of audio segments based on the beat, detecting the pitch frequency of each of the plurality of audio sub-signal frames in each of the audio segments, and estimating the pitch value of each of the plurality of audio segments based on the pitch frequency, the method further comprises:

generating a music rhythm of the audio signal based on specified rhythm information; and generating reminding information of beat and time based on the music rhythm.

9. An electronic device for detecting a melody of an audio signal, comprising:

a processor; and a memory configured to store one or more instructions executable by the processor, wherein the processor, when loading and executing the one or more instructions, is caused to perform a method for detecting the melody of the audio signal, comprising:

performing Short-Time Fourier Transform (STFT) on the audio signal, wherein the audio signal is a humming or cappella audio signal;

acquiring a pitch frequency by pitch frequency detection on a result of the STFT, wherein the pitch frequency is configured to detect a pitch value;

inputting an interpolation frequency at a signal position corresponding to each frame of audio sub-signal in response to detecting no pitch frequency in the frame; and determining the interpolation frequency corresponding to a frame as the pitch frequency of the audio signal;

dividing the audio signal into a plurality of audio segments based on a beat, wherein each of the plurality of audio segments comprises a plurality of audio sub-signal frames;

detecting a pitch frequency of each of audio sub-signal frames in each of the plurality of audio segments, and estimating a pitch value of each of the plurality of audio segments based on the pitch frequency;

determining a pitch name corresponding to each of the audio segments based on a frequency range of the pitch value of each of the plurality of audio segments;

acquiring a musical scale of the audio signal by estimating a tonality of the audio signal based on the pitch name of each of the audio segments;

determining a melody of the audio signal based on a frequency interval of the pitch value of each of the plurality of audio segments in the musical scale;

retrieving song information of the melody of the audio signal, and chording, accompanying and harmonizing the melody of the audio signal.

10. The electronic device according to claim 9, wherein dividing the audio signal into the plurality of audio segments based on the beat, detecting the pitch frequency of each of the audio sub-signal frames in each of the plurality of audio segments, and estimating the pitch value of each of the plurality of audio segments based on the pitch frequency comprises:

determining a duration of each of the audio segments based on a specified beat type;

dividing the audio signal into the plurality of audio segments based on the duration, wherein the audio segments are bars determined based on the beat;

equally dividing each of the audio segments into several audio sub-segments;

separately detecting the pitch frequency of each of audio sub-signal frames in each of the plurality of audio segments, wherein each of the audio sub-segments comprises a plurality of audio sub-signal frames; and determining a mean value of pitch frequencies of a plurality of continuously stable frames of audio sub-signals in the audio sub-segment as the pitch value of each of the plurality of audio segments.

11. The electronic device according to claim 10, wherein upon determining the mean value of the pitch frequencies of the plurality of continuously stable frames of the audio sub-signals in the audio sub-segment as the pitch value of each of the plurality of audio segments, the method further comprises:

calculating a stable duration of the pitch value in each of the audio sub-segments; and setting the pitch value of the audio sub-segment to zero in response to the stable duration being less than a specified threshold.

12. The electronic device according to claim 9, wherein determining the pitch name corresponding to each of the audio segments based on the frequency range of the pitch value of the plurality of audio segments comprises:

acquiring a pitch name number by inputting the pitch value of each of the plurality of audio segments into a pitch name number generation model; and searching, based on the pitch name number, a pitch name sequence table for the frequency range of the pitch value of each of the plurality of audio segments, and determining the pitch name corresponding to the pitch value.

13. The electronic device according to claim 12, wherein the pitch name number generation model is expressed as:

$$K = \left(12 \times \log_2\left(\frac{f_{m-n}}{a}\right)\right) \bmod 12 + 1,$$

represents a pitch name number, $f_{m-n}$ represents a frequency of the pitch value of an $n^{th}$ note in an $m^{th}$ audio segment of the plurality of audio segments, a represents a frequency of a pitch name for positioning, and mod represents a mod function.

14. The electronic device according to claim 9, wherein acquiring the musical scale of the audio signal by estimating the tonality of the audio signal based on the pitch name of each of the audio segments comprises:

acquiring the pitch name corresponding to each of the audio segments in the audio signal;

estimating the tonality of the audio signal by processing the pitch name using a toning algorithm; and determining a number of semitone intervals of a positioning note based on the tonality, and acquiring the musical scale corresponding to the audio signal by calculation based on the number of semitone intervals.

15. The electronic device according to claim 9, wherein determining the melody of the audio signal based on the frequency interval of the pitch value of each of the plurality of audio segments in the musical scale comprises:

acquiring a pitch list of the musical scale of the audio signal, wherein the pitch list records a correspondence between the pitch value of each of the plurality of audio segments and the musical scale;

searching, based on the pitch value of each of the plurality of audio segments in the audio signal, the pitch list for a note corresponding to the pitch value of each of the plurality of audio segments; and arranging the notes in time sequences based on time sequences corresponding to the pitch values in the audio segments, and converting the notes into the melody corresponding to the audio signal based on the arrangement.

16. The electronic device according to claim 9, wherein prior to the step of dividing the audio signal into the plurality of audio segments based on the beat, detecting the pitch frequency of each of the audio sub-signal frames in each of the plurality of audio segments, and estimating the pitch value of each of the audio segments based on the pitch frequency, the method further comprises:

generating a music rhythm of the audio signal based on specified rhythm information; and generating reminding information of beat and time based on the music rhythm.

17. A non-transitory computer-readable storage medium storing one or more instructions wherein the one or more instructions, when executed by a processor of an electronic device, cause the electronic device to perform a method for detecting a melody of an audio signal, comprising:

performing Short-Time Fourier Transform (STFT) on the audio signal, wherein the audio signal is a humming or cappella audio signal acquired by a voice recording device;

acquiring a pitch frequency by pitch frequency detection on a result of the STFT, wherein the pitch frequency is configured to detect a pitch value;

inputting an interpolation frequency at a signal position corresponding to each audio sub-signal frames in response to detecting no pitch frequency; and determining the interpolation frequency corresponding to a frame as the pitch frequency of the audio signal;

dividing the audio signal into a plurality of audio segments based on a beat, wherein each of the plurality of audio segments comprises a plurality of audio sub-signal frames;

detecting a pitch frequency of each of audio sub-signal frames in each of the plurality of audio segments, and estimating a pitch value of each of the plurality of audio segments based on the pitch frequency;

determining a pitch name corresponding to each of the audio segments based on a frequency range of the pitch value of each of the plurality of audio segments;

acquiring a musical scale of the audio signal by estimating a tonality of the audio signal based on the pitch name of each of the audio segments;

determining a melody of the audio signal based on a frequency interval of the pitch value of each of the plurality of audio segments in the musical scale; and retrieving song information of the melody of the audio signal, and chording, accompanying and harmonizing the melody of the audio signal.

* * * * *